(No Model.)
J. D. ENAS.
BEESWAX EXTRACTOR.
No. 321,090. Patented June 30, 1885.
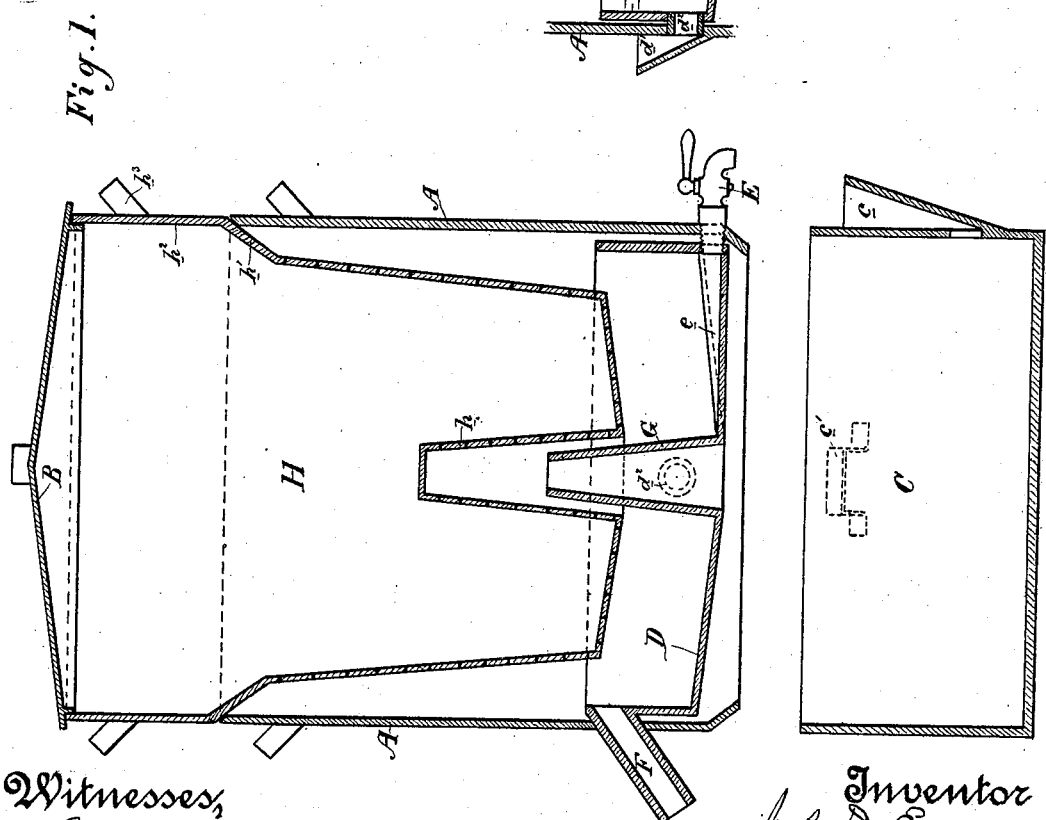

UNITED STATES PATENT OFFICE.

JOSEPH D. ENAS, OF NAPA CITY, CALIFORNIA.

BEESWAX-EXTRACTOR.

SPECIFICATION forming part of Letters Patent No. 321,090, dated June 30, 1885.

Application filed January 30, 1885. (No model.)

*To all whom it may concern:*

Be it known that I, JOSEPH D. ENAS, of Napa City, Napa county, State of California, have invented an Improvement in Beeswax-Extractors; and I hereby declare the following to be a full, clear, and exact description of the same.

My invention relates to that class of wax-extractors in which a foraminous comb-basket is confined within an exterior vessel and is subjected to the action of steam, as exemplified by Letters Patent of the United States No. 308,958, granted to me December 9, 1884, and to which, for a more complete understanding of my present improvements, reference is hereby made.

My invention consists in providing the comb-basket with a top extension projecting above and resting upon the rim of the exterior vessel and provided with handles, that portion of the basket which lies within the exterior vessel being provided with peculiarly sloping slides.

It consists, further, in a filling spout or lip on the exterior vessel and a tube-connection between it and the interior water-pan, by which the latter is supplied, the said lip being so located and arranged that its top shall be a little below the level of the discharge-aperture from the water-pan. These improvements I shall hereinafter severally and particularly explain, and the object of my invention I shall specify in connection with said explanation.

Referring to the accompanying drawings, Figure 1 is a vertical section of my wax-extractor, the upper parts being shown as raised above the kettle. Fig. 2 is a vertical section of the pan D and the lower part of the casing A, taken on different diameter from Fig. 1.

A is a bottomless vessel, or, more properly, an open-ended cylindrical casing.

C is a kettle, in the top of which the lower portion of the vessel A rests. The kettle has a feed-spout, c, through which it is supplied with water, and it is intended to be placed upon a stove or other suitable source of heat. It has handles c' for convenience in moving it, and the vessel A has handles also for a similar purpose.

Within the vessel A, near its bottom or lower portion, is a pan, D. The bottom of pan D is concaved and has a gutter-way, e, the outer end of which communicates with a faucet, E, whereby the pan may be completely drained.

At another portion of the pan D is an overflow-spout, F, to draw off from the surface the liquid in the pan.

At the center of the pan is a hollow truncated open-ended cone, G, the lower end of which communicates directly with the kettle.

Thus far the parts described are substantially similar to the corresponding parts of my previous patent, above referred to.

H is the comb-basket. It consists of a vessel having a foraminous bottom and circumference or sides, the perforations, however, in the sides not extending to the top of the vessel. The sides of this vessel from the upper limit of perforations to the base are made sloping, this portion forming an inverted truncated cone. From the perforated part upward the vessel slopes outwardly at a greater angle, forming of this part, which I have lettered $h'$, an inverted truncated cone, the circumference of which meets the top of the foraminous portion at an angle. The top of the portion $h'$ is exactly on a level with the top of the exterior vessel, A, and is of the same diameter. The vessel H thence extends upwardly in a cylindrical portion, $h^2$, having a diameter equal to that of vessel A, and provided with handles $h^3$. The cover or lid B rests on top of the vessel H.

It will be readily observed, by reference to my previous patent, that the difference between the foraminous vessel or comb-basket H (therein shown) and the present one is as follows: In the former the vessel was cylindrical and was completely inclosed by the exterior vessel, A, the cover B therein resting directly upon the rim or top of vessel A. In the present one the basket H is not cylindrical, but conical, and that portion which lies within vessel A having its circumference sloping at different angles. Then, again, the upper portion extends above and is not inclosed by vessel A. In the previous patent the vessel H was supported from below by bracket-arms $a$ within pan D. In the present case there is no support below at all, but the vessel H is suspended from above by reason of its upper portion being of the same diameter as the exterior vessel, A, and consequently resting upon its rim on the line where the portions $h'$ $h^2$ join.

The object and advantage of this construction are as follows: With the old device, in order to remove the comb-basket H the cover B had to be taken off and the hands of the operator inserted within the steam-jacket formed between the basket and vessel A to grasp the basket and lift it out. In doing this it not unfrequently happened that the hands were scalded or burned. By my present construction I avoid the necessity of inserting the hands within the device. The operator has but to take hold of the handles $h^3$ and lift the basket right out, and no injury will result, as these handles are outside of the steam-jacket. By so constructing the basket, I at the same time provide a support for it, as I have described, and thus can dispense with the bracket-arms below and any steadying-arms which were heretofore required. The suspension support, as described, is further beneficial in that it serves to center the vessel H with perfect accuracy, and thus to avoid the danger of any of the melted wax missing the pan D. With the bottom supports this accuracy was not possible.

The object of the sloping sides of the vessel H is to increase its capacity; and the reason for making the portion $h'$ slope at a greater angle than the lower portion is to rapidly diverge in a short distance from the sides of vessel A, whereby the wax, when it reaches the foraminous portion, is prevented, when exuding, from getting upon the sides of said vessel. From the center of the bottom of the basket H extends upwardly the hollow foraminous truncated cone $h$, the base of which receives the cone G from the water-pan D.

In my former patent I show the feed spout or lip $d'$ as secured to the pan D, and describe it as extending through the outer vessel, A, whereby it could be reached from without; but this construction would provide such a poor joint that the steam would escape. In the present case I place the feed spout or lip $d'$ upon the exterior vessel, A, and connect its base by a horizontal tube, $d^2$, with the pan D. Thus the said pan may be supplied with water from the outside, while a better connection and joint is provided.

But there is a further novel feature in connection with the lip $d'$, which I shall now explain, first giving briefly the general operation of the whole device. Water is first put in the kettle, and also in the pan D, and the honey-combs are put in vessel H. Heat is applied to the kettle, and the steam generated from its water rises through the open bottom of vessel A and through the annular space between said vessel and pan D, and, entering the foraminous sides of the vessel H, melts the combs. It also rises through the hollow cone G of pan D into the hollow cone $h$ of vessel H, through the perforated sides of which it passes, melting the center of the mass of combs. The melted material sinks down through the perforated bottom of vessel H and out of its sides into the underlying body of water in pan D. The purer portion or wax of the melted material floats on the top of the water and overflows through the spout F, while the impure portions sink to the bottom of the pan as sediment and are drawn off when the water is drained through the faucet E. Now, it will be observed that I have so located the feed-spout or lip $d'$ by which the pan D is supplied with water that its top is a little below the level of the discharge-aperture communicating with spout F. Therefore, by feeding water until it reaches the top of the lip $d'$, it is evident that the level of water in pan D will be just a little below the discharge-aperture. This will cause the pure wax to float off through the spout F, leaving behind the thin layer of floating impurities and also the water. By these means all the wax may be floated off without allowing any of the water or floating impurities to escape with it.

Having thus described my invention, what I claim as new, and desire to secure by Letters Patent, is—

1. In a wax-extractor, the exterior vessel, A, in combination with the foraminous vessel or comb-basket H, the lower portion of which lies within and its upper portion extends above the vessel A, substantially as and for the purpose herein described.

2. In a wax-extractor, the exterior vessel, A, in combination with the vessel or comb-basket H, the lower portion of which is foraminous and lies within the vessel A, while its upper portion extends above said vessel and is provided with handles $h^3$, substantially as and for the purpose herein described.

3. In a wax-extractor, the exterior vessel, A, in combination with the vessel or comb-basket H, the lower portion of which is foraminous and lies within the vessel A, and its upper portion extends above and has a diameter equal to that of said vessel, whereby said comb-basket is supported upon and by the rim of vessel A, substantially as and for the purpose herein described.

4. In a wax-extractor, the exterior vessel, A, and the water-pan D within its base, in combination with the inverted truncated conical-shaped foraminous vessel or comb-basket H within vessel A and above the water-pan, substantially as and for the purpose herein described.

5. In a wax-extractor, the exterior vessel, A, and the water-pan D within its base, in combination with the inverted truncated conical-shaped foraminous vessel or comb-basket H, having an upper unperforated portion, $h'$, the slope of whose sides is greater than the foraminous portion, substantially as herein described.

6. In a wax-extractor, the exterior vessel, A, and the water-pan D within its base, in combination with the vessel or comb-basket H, having a cylindrical top portion, $h^2$, extending above vessel A, and of a diameter equal to that of said vessel, a portion, $h'$, extending downwardly within vessel A, and of an inverted truncated conical shape, and a foraminous lower portion with the vessel having sides sloping at a less angle than portion $h'$, substantially as and for the purpose herein described.

7. In a wax-extractor, the exterior vessel, A, having a spout or lip, $d'$, in combination with the interior water-pan, D, and the tube $d^2$, connecting the lip $d'$ with the water-pan, substantially as and for the purpose herein described.

8. In a wax-extractor, the exterior vessel, A, in combination with the interior water-pan, D, the discharge-spout F, projecting from the top of said pan outwardly through the exterior vessel, the lip $d'$ on the exterior vessel having its top just below the level of the discharge-aperture of pan D, and the tube $d^2$, connecting the lip $d'$ with the pan, substantially as herein described.

9. The wax-extractor consisting of the open-ended cylindrical vessel or casing A, having a lip, $d'$, the steam-generating kettle C, into which it fits, the vessel or comb-basket H, having a cylindrical top portion, $h^2$, extending above and resting on the top of vessel A, and provided with handles $h^3$ and a cover, $B^3$, an inverted conical portion, $h'$, within the vessel A, and an inverted conical base or lower portion perforated, as described, and provided with a central perforated hollow cone, $h$, and the water-pan D, having a central open-ended hollow cone, G, a discharge or overflow spout, F, a drain-faucet, E, and a feed-tube, $d^2$, communicating with the lip $d'$ on the vessel A, all arranged substantially as and for the purpose herein described.

In witness whereof I have hereunto set my hand.

JOSEPH D. ENAS.

Witnesses:
S. H. NOURSE,
H. C. LEE.